Feb. 2, 1932. W. D. GRAY 1,843,873
ICE CREAM DIPPER
Filed Aug. 30, 1930
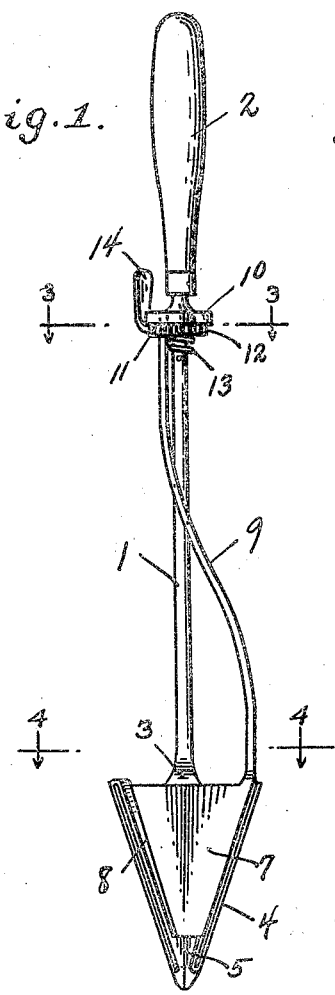
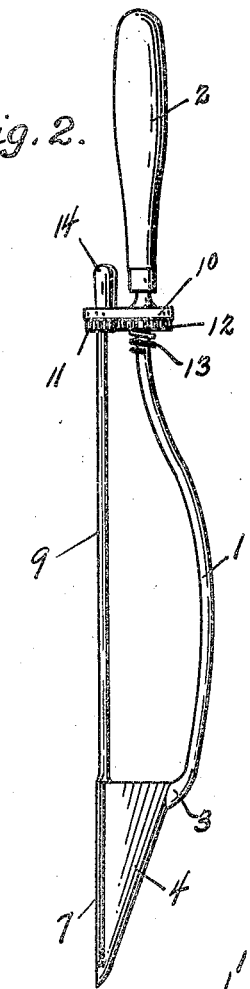
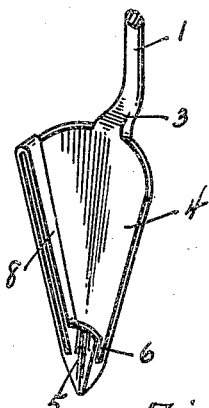
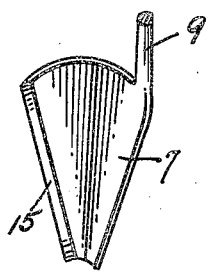
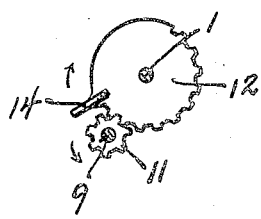

Patented Feb. 2, 1932

1,843,873

UNITED STATES PATENT OFFICE

WELLSLEY D. GRAY, OF LORAIN, OHIO

ICE CREAM DIPPER

Application filed August 30, 1930. Serial No. 479,005.

The present invention relates to improvements in ice cream dippers for use in dipping or scooping a predetermined quantity of ice cream from a bulk in an ice cream freezer and subsequently ejecting the measured quantity or molded portion of ice cream in plates, cones or the like.

One of the important objects of the present invention is to provide an ice cream dipper which will mold the ice cream removed from the freezer in a substantial cone.

A further and important object is to provide an ice cream dipper of the above mentioned character that will at all times be positive and efficient in its operation, the same being further simple in construction, inexpensive, strong and durable and further well adapted to the purposes for which it is designed.

Other objects and advantages of the invention will become apparent during the course of the following description when taken in connection with the accompanying drawings.

In the accompanying drawings wherein like reference characters indicate corresponding parts throughout the several views:

Figure 1 is an elevational view of my improved ice cream dipper.

Figure 2 is a similar view taken at right angles to Figure 1.

Figure 3 is a transverse section taken approximately on the line 3—3 of Figure 1 looking downwardly.

Figure 4 is a similar section taken on the line 4—4 of the same figure and also looking downwardly.

Figure 5 is a detail perspective view of the stationary bowl, and

Figure 6 is a similar view of the oscillatory arcuate blade that cooperates with the similar shaped bowl.

In the drawings wherein for the purpose of illustration is shown the preferred embodiment of my invention, the numeral 1 designates a slightly curved shank on the upper end of which is secured a handle 2. The lower end of the shank is off-set as at 3 and carried by the off-set lower end 3 is an inverted substantially semi-conical bowl 4, the bowl being connected to the lower end of the shank preferably at the base portion of the semi-conical bowl.

The apex portion of the semi-conical bowl 4 is formed with what I term a head 5 and the inner portion of this head is slotted as at 6 so that the inner end portion of the head is spaced with reference to the adjacent portion of the bowl 4. The slot 6 provides a guide for the smaller end of an oscillatory arcuate blade 7, the sides of which gradually converge toward the lower end of said blade.

A strip 8 connects the inner end of the head 5 with the upper edge of the semi-conical bowl 4 at one longitudinal edge of the bowl to form a guide loop through which one edge portion of the arcuate blade 7 is operable. The arcuate blade 7 cooperates with the inner face of the semi-conical bowl 4 and extending upwardly from the upper edge of the blade 7 adjacent one longitudinal edge thereof is the spindle 9. This spindle is off-set and the upper end thereof is journaled within a suitable bearing plate 10 secured on the shank 1 directly below the handle 2. A pinion 11 is fixedly secured on the upper end portion of the spindle 9 for meshing engagement with the gear 12 that is rotatably mounted on the shank 1 directly below the bearing plate 10. A coil spring 13 encircles the shank 1 at the upper end portion thereof, one end of this coil spring being connected to the shank while the other end is connected to the rotatable gear 12. A thumb piece 14 is fixedly attached to the gear member 12 and extends beyond the bearing plate within convenient reach of the user of the ice cream dipper.

The arcuate blade 7 operates in the slot 6 and through the guide loop formed by the strip 8 with the body portion of the semi-conical bowl.

The operation of my improved ice cream dipper may be briefly stated as follows. Normally the parts are arranged as shown in Figures 1, 2 and 4 and the bowl is plunged into the bulk of ice cream in the ice cream freezer. The thumb piece 14 is then actuated to effect the movement of the blade 7 to the position shown in the dotted lines in Figure 4 so that a substantially conical shaped mold will be formed and the ice cream confined within this mold may be withdrawn from the bulk of the ice cream in the freezer and deposited in a plate or cone or other receptacle. In order to facilitate the proper cutting of the ice cream by the blade 7, one edge thereof is sharpened as indicated at 15. By releasing the thumb piece 14, the coil spring 13 will return the blade to its initial position within the confines of the semi-conical bowl 4 so that the molded ice cream will be ejected from the dipper with facility and convenience.

While I have shown the preferred embodiment of the invention, it is to be understood that minor changes in the size, shape and arrangement of parts may be resorted to without departing from the spirit of the invention and the scope of the appended claims.

Having thus described the invention what I claim is:

1. In an ice cream dipper, the combination of a shank, a semi-conical bowl on the lower end thereof, a handle on the upper end of the shank, an arcuate shaped blade tapering gradually toward its lower end cooperating with the inner wall of the bowl, and mounted for oscillatory movement with respect to the bowl, a guide loop at one longitudinal edge of the bowl through which the blade is operable, and means for actuating the blade.

2. In an ice cream dipper, the combination of a shank, a semi-conical bowl having its base portion connected to the lower end of the shank, a handle on the other end of the shank, a slotted head formed on the apex of the semi-conical bowl, a guide loop arranged along one longitudinal edge portion of the bowl, an arcuate shaped blade tapering gradually toward its lower end cooperating with the inner wall of the semi-conical bowl, the apex portion of the blade being fitted in the slotted head, one edge portion of the blade being operable through the guide loop, and means for actuating the blade with respect to the bowl to form a substantially conical shaped mold.

3. In an ice cream dipper, the combination of a shank, a semi-conical bowl having its base portion connected to the lower end of the shank, a handle on the other end of the shank, a slotted head formed on the apex of the semi-conical bowl, a guide loop arranged along one longitudinal edge portion of the bowl, an arcuate shaped blade tapering gradually toward its lower end cooperating with the inner wall of the semi-conical bowl, the apex portion of the blade being fitted in the slotted head, one edge portion of the blade being operable through the guide loop, and means for actuating the blade with respect to the bowl to form a substantially conical shaped mold, said operating means including a spindle, the lower end thereof being connected to the upper portion of the blade, a bearing plate on the upper end portion of the shank and within which the upper end of the spindle is journaled, intermeshing gears arranged on the upper end of the spindle and shank respectively, and a thumb piece for operating the gearing.

In testimony whereof I affix my signature.

WELLSLEY D. GRAY.